US008660345B1

(12) United States Patent
Fang et al.

(10) Patent No.: US 8,660,345 B1
(45) Date of Patent: Feb. 25, 2014

(54) COLORIZATION-BASED IMAGE COMPRESSION USING SELECTED COLOR SAMPLES

(75) Inventors: Hui Fang, Mountain View, CA (US); Chenguang Zhang, Beijing (CN)

(73) Assignee: Google Inc., Mountain View, CA (US)

( * ) Notice: Subject to any disclaimer, the term of this patent is extended or adjusted under 35 U.S.C. 154(b) by 150 days.

(21) Appl. No.: 13/206,719

(22) Filed: Aug. 10, 2011

Related U.S. Application Data

(60) Provisional application No. 61/412,784, filed on Nov. 11, 2010.

(51) Int. Cl.
*G06K 9/00* (2006.01)
*G06K 9/34* (2006.01)

(52) U.S. Cl.
USPC ........................................................ 382/166

(58) Field of Classification Search
USPC ......... 382/162, 164, 166, 232, 233, 237, 242, 382/274; 358/1.9, 3.1, 3.27, 448, 474, 515, 358/518; 345/88–89, 690
See application file for complete search history.

(56) References Cited

U.S. PATENT DOCUMENTS

| | | | | |
|---|---|---|---|---|
| 6,345,124 | B1 * | 2/2002 | Nakanishi | 382/242 |
| 7,705,865 | B2 * | 4/2010 | Hsu et al. | 345/690 |
| 8,243,348 | B2 * | 8/2012 | Takeuchi | 358/474 |
| 2005/0226526 | A1 * | 10/2005 | Mitsunaga | 382/274 |

OTHER PUBLICATIONS

Cheng, L., et al., "Learning to compress images and videos," In ICML '07: Proceedings of the 24th international conference on Machine learning, pp. 161-168, New York, NY, USA, 2007. ACM.
De Simone, F., et al., A comparative study of JPEG 2000, AVC/H. 264, and HD Photo. In SPIE Optics and Photonics, Applications of Digital Image Processing XXX, vol. 6696, 2007, 12 Pages.
He, X., "A unified active and semi-supervised learning framework for image compression," 2009 IEEE Conference on Computer Vision and Pattern Recognition, pp. 65-72, 2009.
"Information Technology-JPEG2000 image coding system—Part 1: Core coding system," International Standard, ITU-T recommendation T.800 and ISO/IEC 15444-1, Dec. 15, 2000, pp. i-xii, 1-226.
Levin, A., "Colorization using optimization," In SIGGRAPH '04: ACM SIGGRAPH 2004 Papers, pp. 689-694, New York, NY, USA, 2004. ACM.
Wiegand, T., "Overview of the h.264/avc video coding standard," In IEEE Trans. Circuits Syst. Video Techn., pp. 560-576, 2003.

* cited by examiner

*Primary Examiner* — Amir Alavi
(74) *Attorney, Agent, or Firm* — Fenwick & West LLP

(57) ABSTRACT

A system and method provide compressing an input color image using selected color samples of the input image. The image compression method comprises accessing the input color image and generating a grayscale image and color channel images from the input image. The method compresses the grayscale image and segments the color channel images into multiple image segments. For each color channel of the input image, the method selects a number of color samples for each image segment and compresses the selected color samples. From the compressed grayscale image and selected color samples, the method generates a compressed input color image.

33 Claims, 4 Drawing Sheets

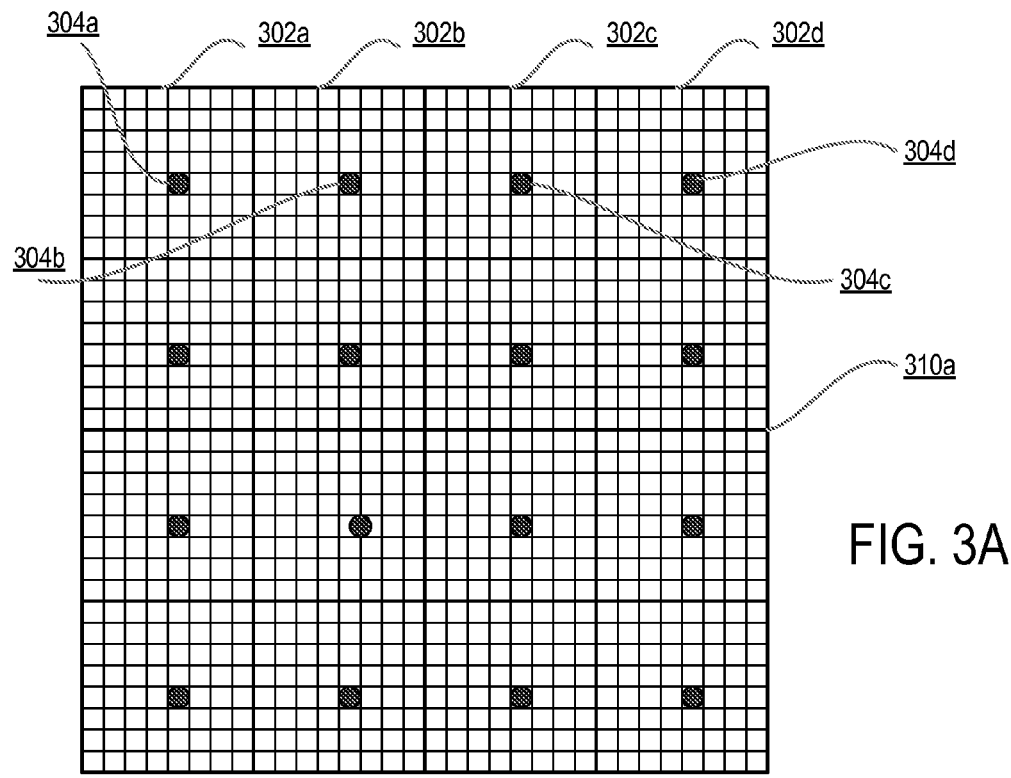
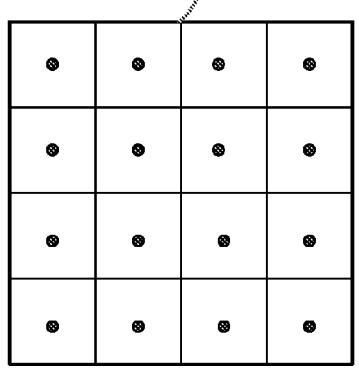 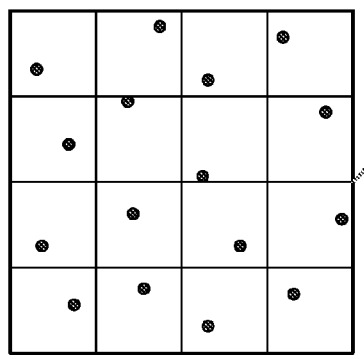
FIG. 3B — U Channel Regular Selection
FIG. 3C — V Channel Random Selection

COLORIZATION-BASED IMAGE COMPRESSION USING SELECTED COLOR SAMPLES

CROSS-REFERENCE TO RELATED APPLICATIONS

This application claims the benefit of U.S. Provisional Application No. 61/412,784, filed Nov. 11, 2010, entitled "Image Compression via Colorization Using Semi-Regular Color Samples" which is incorporated by reference in its entirety.

BACKGROUND OF THE INVENTION

The invention relates generally to image compression, and more particularly to encoding a color image using image colorization and selected color samples.

Image compression uses a variety of encoding methods, such as Joint Photographic Experts Group (JPEG) JPEG200 encoding, to reduce information redundancies contained in an image. Image colorization is an image compression technique that recovers a color image from its corresponding grayscale image and a set of selected color samples of the color image. Generally, image colorization technique stores a grayscale version of a color image and a few color samples as representative pixels of the color image. From the color samples, image colorization technique predicts the color for the rest of the pixels of the color image.

Selecting an optimal set of color samples for colorization can be computationally costly. A selected color sample needs to represent the color range of its neighboring pixels as much as possible for reasonable performance of colorization. Existing image colorization techniques, such as machine learning based colorization, rely on a large set of color labels of representative pixels of a color image for a decoder to reconstruct the color image. A large set of color samples contributes to the large size of the reconstructed color image and a low compression rate. Additionally, selecting a large set of color samples of representative pixels is slow and hard to scale for compressing large size color images.

SUMMARY

A method, system and computer program product provides image compression using image colorization and selected color samples.

In one embodiment, an input color image having multiple pixels is access and a grayscale image and color channel images are generated from the input color image. The grayscale image represents the intensity information of the input color image and the color channel images represent the color information of the input color image. The grayscale image and the color channel images are divided into multiple image segments. For each image segment of a color channel of the color images, zero, one or more color samples are selected from the segment. The grayscale image and selected color samples for each color channel are compressed. A residual image is also optionally generated and compressed, where the residual image represents the difference of the input color image and an image reconstructed during colorization-based compression. The compressed grayscale image, compressed color samples, and compressed residual image together form a final compressed image file.

From the compressed grayscale image, selected color samples and the residual image, the input color image can be reconstructed by colorization-based decompression.

Another embodiment includes a non-transitory, computer-readable medium storing executable computer modules including a luma-chroma separation module, an image segmentation module, a color sample selection module, an image compression module and an optional residual image generation module. A further embodiment includes a non-transitory computer-readable medium that stores executable computer program instructions for compressing images in the manner described above.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

BRIEF DESCRIPTION OF THE FIGURES

FIG. 3A is an example color sample selection of a segmented image of a color channel of an input color image.

FIG. 3B is an example a segmented image of a first color channel of an input color image after color sample selection.

FIG. 3C is an example a segmented image of a second color channel of an input color image after color sample selection.

The figures depict various embodiments of the invention for purposes of illustration only, and the invention is not limited to these illustrated embodiments. One skilled in the art will readily recognize from the following discussion that alternative embodiments of the structures and methods illustrated herein may be employed without departing from the principles of the invention described herein.

DETAILED DESCRIPTION

I. System Overview

The amount of compression of a color image using colorization is often determined in part by the quality of the selected color samples. One way to improve the image compression rate and quality is to select an optimal set of color samples of the color image and then compress the samples. One advantage of compressing selected color samples of a color channel of a color image results in high compression rate while maintaining acceptable image quality. Another related advantage of compressing selected color samples of a color channel allows a colorization-based encoder to scale for large size images. Selecting color samples with extreme grayscale values within an image segment further helps enhancing compression performance in terms of peak signal-to-noise ratio (PSNR) because selecting color samples with extreme grayscale values avoids predicting the colors of pixels with extreme grayscale values, which is computationally complex and often results in poor PSNR.

Figure 1:
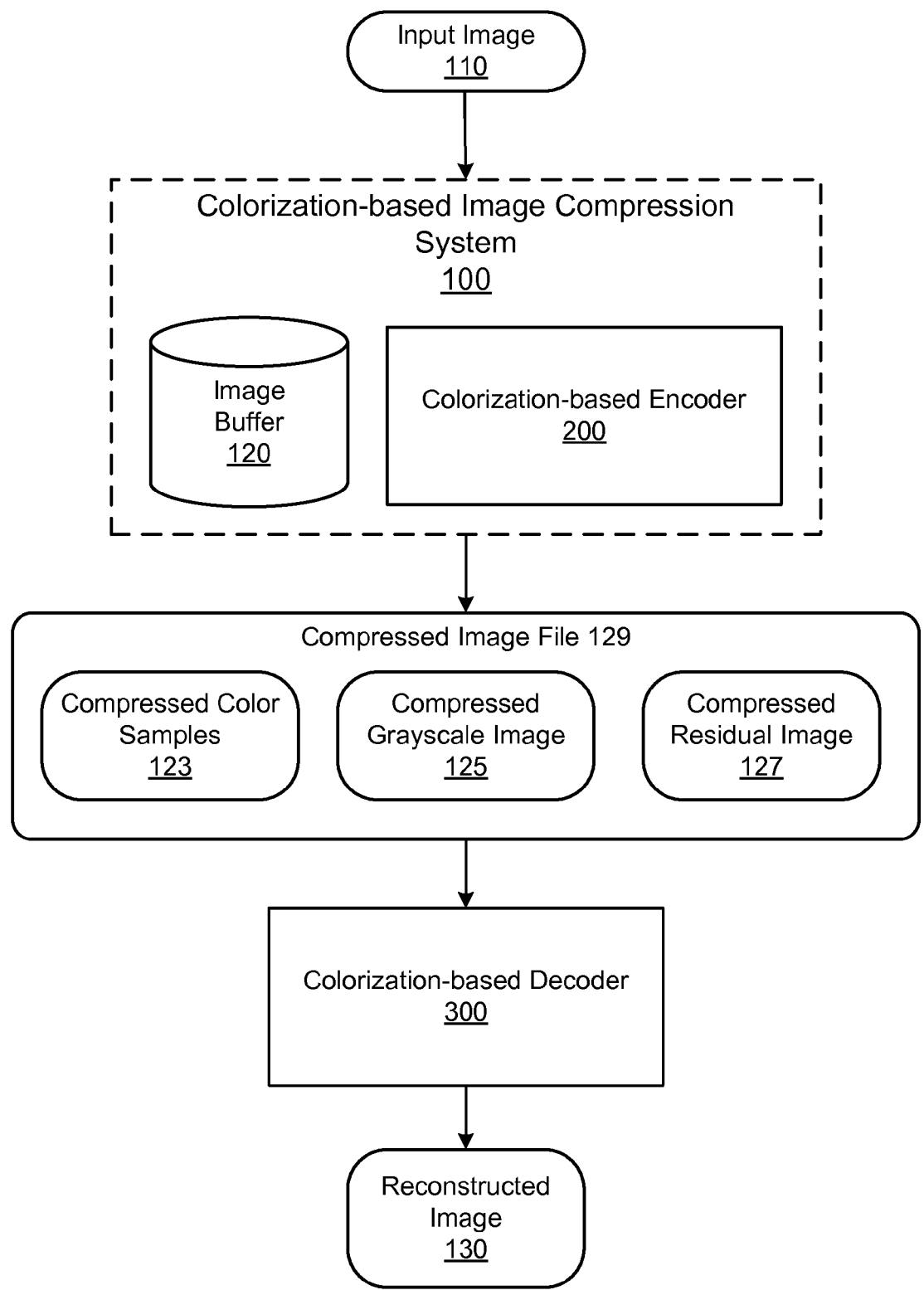
FIG. 1 is a block diagram of a colorization-based image compression system.

FIG. 1 is a block diagram illustrating a colorization-based image compression system 100. In the embodiment illustrated in FIG. 1, the image compression system 100 includes a colorization-based encoder 200, and an image buffer 120. The image compression system 100 receives an input color image 110 from some source. The colorization-based encoder 200 generates a corresponding grayscale image of the input color image 110 and segments the input image 110 into multiple image segments. For each color channel of the input image 110, the encoder 200 independently selects zero or more color samples for each image segment and stores selected color samples information (e.g., pixel location and selection) in the image buffer 120. The encoder 200 encodes the grayscale image to generate a compressed grayscale image 125. The encoder 200 compresses the selected color samples of the input image 110 to generate compressed color samples 123. From the compressed grayscale image 125 and selected color samples 123, the encoder 200 reconstructs an image corresponding to the input image 110 and optionally generates a residual image of the input image 110 as the difference between the original input image 110 and the corresponding reconstructed input image. The encoder 200 further compresses the residual image to generate a compressed residual image 127.

The encoder 200 stores as a compressed image file 129 the compressed grayscale image 125, compressed residual image 127 and compressed color samples 123 to a computer readable media. The pixel location and selection information can be embedded in the image file 129 or stored in a separate side file (e.g., metadata file). Other embodiments do not store the pixel location and infer the pixel location from the selection information. The colorization-based decoder 300 can access the compressed image file 129 from the media. The encoder 200 can also be configured to transmit, via a network, the compressed image file 129 to decoder 300. In either scenario, the colorization-based decoder 300 decodes the compressed grayscale image 125, compressed selected color samples 123 and the compressed residual image 127 to reconstruct an output image 130.

The image compression system 100 can be implemented in a variety of different embodiments, including various types of devices that include image capture devices, such as digital cameras, or input devices that have integrated digital cameras such as mobile phones, or into standalone devices that can store and serve images, such as media servers, digital video recorders, set-top receivers, and the like. The image compression system 100 can also be implemented in networked based systems, such as part of video or image hosting sites. For example, in one embodiment, the colorization-based decoder 300 is located at a video playback device of a user. In other embodiments, the colorization-based encoder 200 and decoder 300 are in one image processing device.

The input color image 110 has a width, a height and a color format. Each pixel of the input color image 110 is represented by multiple color channels in some color space. In one embodiment, pixels of the input color image 110 is in RGB color space (R: red, G: green and B: blue). The input color image 110 can be in other color space, such as YCbCr (Y: luma, Cb: chroma blue difference and Cr: chroma red difference) or HSV (H: hue, S: saturation and V: value).

II. Colorization-Based Image Compression

Figure 2:
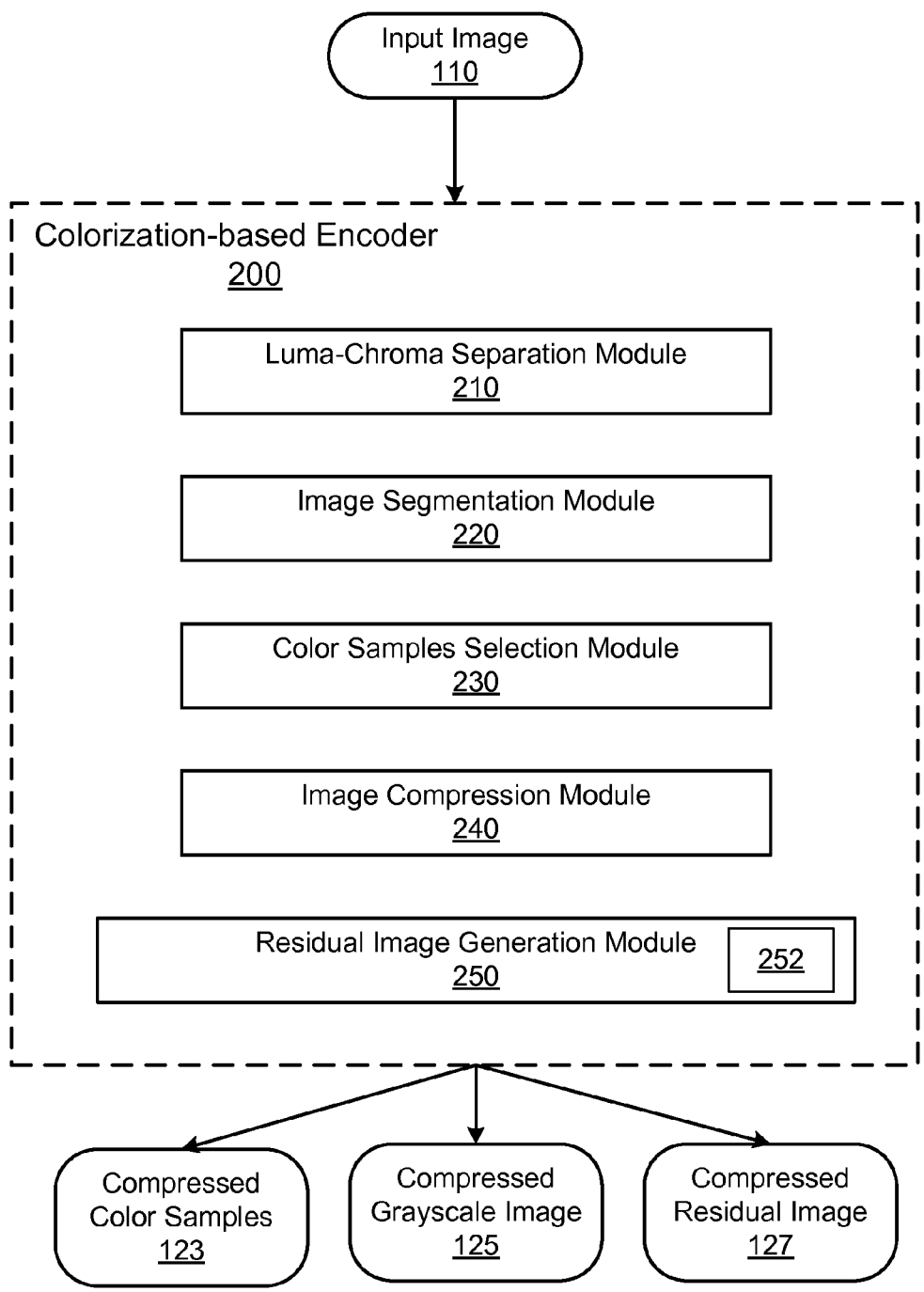
FIG. 2 is a block diagram of a colorization-based encoder.

FIG. 2 is a block diagram of the colorization-based encoder 200. In the embodiment illustrated in FIG. 2, the colorization-based encoder 200 has a luma-chroma separation module 210, an image segmentation module 220, a color sample selection module 230, an image compression module 240 and an optional residual image generation module 250. Other embodiments of the colorization-based encoder 200 may have additional or different modules.

The luma-chroma separation module 210 generates a grayscale image from the input color image 110 and separates the luma and chroma components of the input color image 110. The grayscale image generated from the input color image 110 corresponds to the input color image 110, and each pixel therein carries only intensity information of the corresponding pixel of the input color image 110. The chroma components of the input image 110 are represented by color channels of the input color image 110. In one embodiment, the luma-chroma separation module 210 converts the input color image 110 in RGB color space into an image in YUV color space. The converted image in YUV color space is represented by three separate corresponding images in YUV color space, where the Y image represents the intensity information (i.e., luminance) of the input color image 110 and is used as the grayscale image of the input color image 110. The chroma information of the input color image 110 is represented by the U channel image and V channel image. Any RGB-to-YUV conversion algorithms known to those of ordinary skill in the art can be used to generate the grayscale image. Other embodiments may use other grayscale image generation schemes, such as linear gamma-compression of primary intensities of a color image.

The image segmentation module 220 segments the grayscale image and color channel images of the input color image 110 into multiple segments. In one embodiment, the image segmentation module 220 segments the corresponding grayscale image and color images of the input color image 110 in YUV color space into multiple 8×8 pixels image segments. Other embodiments may use different sized image segments such as 16×16 pixels or 4×4 pixels. The segment size is a design choice, which can be determined based on a variety of factors, such as image content complexity. FIG. 3A is an example of a color image in YUV color space (e.g., U channel image or V channel image) of an input image of 32×32 pixels segmented into 16 image segments of 8×8 pixels.

The color sample selection module 230 selects a number of color samples for each color channel of the input color image 110. It is noted that luma and chroma components of a color image are generally correlated, and that it is computationally easier to interpolate the color of a pixel from its neighboring pixels than to extrapolate the color of a pixel at extreme grayscale pixel values. To reduce the computation cost of colorization, the color sample selection module 230 is configured to select a set of color samples for each color channel based upon the correlation between luma and chroma components of the input color image 110. The color sample selection module 230 is further configured such that each selected color sample optimally represents the color range of its neighboring pixels.

For each image segment of a color channel, the color sample selection module 230 selects zero, one or many color samples for the image segment. The number of color samples to be selected for a segment is configurable depending one or more factors, such as image content complexity or dimension of the image segment. One embodiment to select an optimized number of color samples for a segment is to have multiple color sample selection methods and use the color samples selected by a selection method that gives the best compression performance among the multiple selection methods. The selected color samples of a color channel forms a sub-sampled version of an input color image. For each image segment of a color channel, the color sample selection module 230 can use any of the following selection color selection methods:

REGULAR: select one color sample per image segment, each sample selected at the same pre-determined pixel location in each segment throughout the entire color channel.

MAX: select one color sample for an image segment, where the grayscale value of the selected pixel is maximum among the pixels of the same image segment.

MIN: select one color sample for an image segment, where the grayscale value of the selected pixel is minimum among the pixels of the same image segment.

MIX: select one color sample for an image segment for all segments in the channel by iteratively and alternately selecting the maximum and minimum grayscale values in neighboring segments in each row. For example, the color sample selection module 230 selects for the first segment a color sample whose grayscale value is maximum of the image segment, selects for next horizontal neighboring segment a color sample whose grayscale value is minimum of the image segment and continues the alternative max-min selection for the horizontal row of image segments. For the second row of image segments, the color sample selection module 230 selects for the first segment a color sample whose grayscale value is minimum of the image segment, selects for next horizontal neighboring segment a color sample whose grayscale value is maximum of the image segment.

MAX+MIN: select two color samples for an image segment, one of which has the maximum grayscale pixel value and the other has the minimum grayscale value among the pixels of the same image segment.

RANDOM: the color sample selection module 230 randomly selects one color sample for an image segment. In one embodiment, the color sample selection module 230 uses a pseudo-random number generation mechanism with a random seed to determine the location of the color sample in the image segment.

In one embodiment, the color sample selection module 230 selects color samples for all image segments of a color channel using each one of the above selection methods. The selected samples are then compressed by the image compression module 240. The color sample selection module 230 compares the compression performance of the selected color samples for each selection method, for example by comparing the peak-signal-to-noise (PSNR) ratios of the compressed color channel. Based on the compression performance comparison, the color sample selection module 230 picks the set colors sample that results in the best compression performance and stores compressed color samples, and with information identifying the selection method for the channel. The selection method and random seed (if using random selection) are used by a colorization-based decoder for decompression.

The color sample selection module 230 selects a number of color samples for each segment of each color channel of the input color image 110. Two color channels can use same or different color sample selection methods or parameters. The color sample selection methods/parameters for a color channel are independently determined from another color channel. Within the same color channel, image segments can have same or different color sample selection methods or parameters. For example, the samples within a channel can be selected using a mix of REGULAR and RANDOM selection methods.

To further illustrate the color sample selection, FIG. 3A is an example color sample selection of a segmented image of a color channel of an input color image 110. Assume that the input color image 110 is in RGB color space having 32×32 pixels, and input color image 110 is converted to YUV color space as described above. The segmented image 310a of the color channel illustrated in FIG. 3A represents one of the color channels, U channel or V channel, of the converted image in YUV color space, here for example U channel.

The segmented image 310a contains 16 segments (e.g., 302a, 302b, 302c and 302d), each having 8×8 chroma U pixels. For each 8×8 pixel segment, the color sample selection module 230 uses REGULAR option to select one color U pixel per segment at a fixed location within each segment, relative to an origin of the segment. In one embodiment, the fixed location is a pre-determined one of the central four pixels in each segment (since segments will typically be a multiple of 2 pixels in height and width). For example, the color sample selection module 230 selects color U pixel for each segment at the location (5, 5) in each segment. For example, the color sample selection module 230 selects color pixel 304a located at coordinates (5, 5) of segment 302a, color pixel 304b at the same coordinates (5, 5) of segment 302b, color pixel 304c at the same coordinates (5, 5) of segment 302c and color pixel 304d at the same coordinates (5, 5) of segment 302d.

FIG. 3B illustrates the segmented U channel image 310b-U after selecting 16 color pixels to represent the entire U channel image of the input color image 110. By selecting 16 color samples to represent the entire U channel image 310b-U, the colorization-based encoder 200 is able to encode 16 selected U color pixels (instead of total 32×32 U color pixels) in much reduced performance time while keeping an acceptable image quality after compression.

For V channel of the input color image 110, the color sample selection module 230 selects 16 color samples of V component similar to the U channel color sample selection. However, the color sample selection module 230 can independently choose the selection option for V channel. Using the example of FIG. 3A, the color sample selection module 230 uses REGULAR selection to select 16 color pixels for U channel (e.g., FIG. 3B) and can use RANDOM selection or other selection options to select 16 color pixels for V channel (e.g., FIG. 3C). For V channel of the input color image 110, the color sample selection module 230 similarly allows the colorization-based encoder 200 to encode only 16 selected V color pixels (instead of total 32×32 V color pixels) for the entire V channel image.

In order for the colorization-based decoder 300 to recover the location of a selected color sample during decompressing process, the color sample selection module 230 stores information indicating the color sample selection method used for each sample, and where appropriate, the parameters associated with the selection method as side information. For example, for the REGULAR selection, the color sample selection module 230 stores the pre-determined pixel location (e.g., two-dimensional coordinates of the selected color sample). For RANDOM selection, the color sample selection module 230 stores the random seed used by the pseudo-random number generator such that the colorization-based decoder 300 uses the same random seed to generate a same sequence of random numbers again.

The image compression module 240 compresses the grayscale image to generate a compressed grayscale image the input color image 110 (e.g., the compressed grayscale image 125 in FIG. 1). The image compression module 240 also compresses the selected color samples 123 for each color channel of the input color image 110. The image compression module 240 also compresses a residual image 127 of the input color image 110. The image compression module 240 can apply any existing image compression scheme (e.g., JPEG2000 or H.264/AVC image compression mode) to compress the grayscale image, and selected color samples for each color channel and the residual image. For example, the selected color samples of a color channel forms a sub-sampled version of the input color image 110, and using lossy JPEG2000 to compress the selected color samples for a color channel of the input color image 110 captures the spatial coherence of color samples of the input image 110, which helps to achieve desirable compression quality and compression rate.

The residual image generation module 250 generates a residual image of the input color image 110 using the compressed image of the input color image 110 as the following:

$$I_{residual} = I_{orig} - I_{reconstruct} \quad (1)$$

where $I_{orig}$ represents the original input color image 110, $I_{reconstruct}$ representing a reconstructed input color image 110 from the compressed grayscale image 125 and compressed selected color samples 123 of the input color image 110. The residual image $I_{residual}$ represents the difference between the original input color image 110 and compressed input color image 110.

The residual image generation module 250 generates the reconstructed input color image 110 $I_{reconstruct}$ using the compressed grayscale image and compressed selected color sample for each color channel of the input color image 110. In one embodiment, the residual image generation module 250 includes an image decoder 252 to generate the reconstructed input color image 110 $I_{reconstruct}$. The image decoder 252 can be a simplified version of the colorization-based decoder 300 and uses an image decompression scheme corresponding to the compression scheme used by the image compression module 240. The residual image generation module 250 stores the residual image $I_{residual}$ in the image buffer 120 for the image compression module 240 for compressing. The compressed residual image is stored to a computer readable media, or alternatively, transmitted to the colorization-based decoder 300 to reconstruct the input color image 110.

Figure 4:
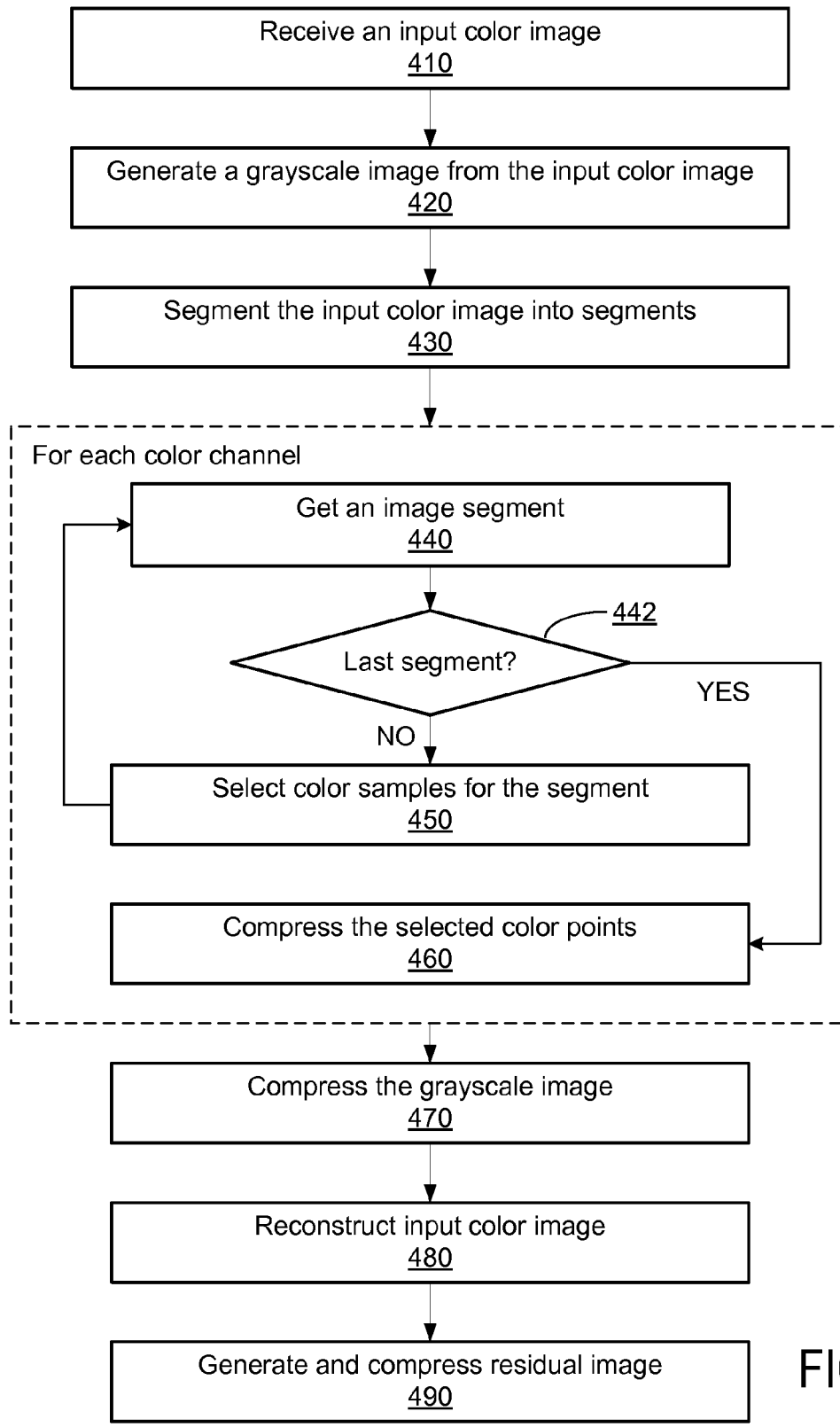
FIG. 4 is a flow chart of colorization-based image compressing using selected color samples.

FIG. 4 is a flow chart of colorization-based image compression using selected color samples. Initially, the colorization-based encoder 200 receives 410 an input color image and generates 420 a grayscale image from the input color image. For example, the encoder 200 converts the input color image in RGB color space into one in YUV color space and uses the Y image as the grayscale image of the input color image. The color information of the input color image is represented by the color channel images (e.g., U channel image and V channel image) of the input color image. The encoder 200 segments 430 the grayscale image and color channel images of the input image 110 into multiple image segments (e.g., 8×8 pixels segment).

For each color channel, the encoder 2000 gets 440 an image segment and checks 442 whether it is the last image segment of the color channel image. If the segment is not the last segment, the encoder 2000 selects 450 zero, one or many color samples from the segment. The selected color samples forms a sub-sampled version of the input color image. The encoder 200 sends the location of selected color samples, selection scheme and other related color sample selection parameters to a colorization-based decoder for reconstructing the input color image. The encoder 200 compresses 460 the selected color samples and gets next image segment for similar processing.

The encoder 200 also compresses 470 the corresponding grayscale image of the input color image. From the compressed grayscale image and compressed selected color samples for the color channels of the input color image, the encoder 200 reconstructs 480 the input color image and generates and compresses 490 a residual image that represents the difference of the input color image and the reconstructed input color image.

The colorization-based decoder 300 decompresses the compressed input color image 110 by the colorization-based encoder 200 to reconstruct the input color image 110 as faithful as possible in terms of PSNR. The colorization-based decoder 300 retrieves the compressed grayscale image 125 of the input color image 110, the compressed color samples 123 selected for each color channel, color sample selection parameters (e.g., location in an image segment of a selected color sample and selection option) and compressed residual image 127 of the input color image 110 for the reconstruction.

In one embodiment, the colorization-based decoder 300 uses an image decompression scheme corresponding to the compressing scheme used by the colorization-based encoder 200, such as JPEG2000 decompression algorithm. Specifically, the colorization-based decoder 300 retrieves the compressed grayscale image 125 and reconstructs a grayscale image using the corresponding decompression algorithm. For example, if the encoder 200 encodes the grayscale image using JPEG2000 compression algorithm, the decoder 300 reconstructs the grayscale image using corresponding JPEG2000 decompression algorithm.

The decoder 300 retrieves compressed color samples for each color channel and information indicating the color sample selection method used for each sample and the parameters associated with the selection method and reconstructs each color channel. For example, for each image segment, the decoder 300 reconstructs the selected color sample(s) for the image segment and uses the reconstructed color samples to interpolate the remaining color pixels.

The decoder 300 reconstructs the residual image similarly as grayscale image reconstruction. From the reconstructed grayscale image and color channel images, the decoder 300 reconstructs a first output image. For example, responsive to the grayscale image and color channel images being generated from RGB to YUV color space conversion at the encoder 200, the decoder 300 performs YUV-to-RGB color space conversion to include the luminance component (e.g., from the reconstructed Y image) and chrominance components (e.g., from the reconstructed U and V color channel images). The decoder 300 adds the reconstructed residual image to the first output image to reduce any reconstruction errors (including errors from color sample interpolation) and to generate a final output image (e.g., the reconstructed image 130 in FIG. 1).

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

The invention has been described in particular detail with respect to one possible embodiment. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present the features of the invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the invention include process steps and instructions described herein in the form of an algorithm. It should be noted that the process steps and instructions of the invention could be embodied in software, firmware or hardware, and when embodied in software, could be downloaded to reside on and be operated from different platforms used by real time network operating systems.

The invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the method steps. The structure for a variety of these systems will be apparent to those of skill in the, along with equivalent variations. In addition, the invention is not described with primary to any particular programming language. It is appreciated that a variety of programming languages may be used to implement the teachings of the invention as described herein, and any reference to specific languages are provided for disclosure of enablement and best mode of the invention.

The invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter.

Accordingly, the disclosure of the invention is intended to be illustrative, but not limiting, of the scope of the invention, which is set forth in the following claims.

What is claimed is:

1. A computer-implemented method for compressing a color image using selected color samples of the color image, the method comprising:
   accessing a color image having a plurality of pixels, each pixel containing intensity and color information of the image;
   separating the color image into a grayscale image and a plurality of color channel images using the intensity and color information;
   dividing the color channel images into a plurality of image segments;
   selecting color samples from the plurality of image segments; and
   compressing the color image using the grayscale image and the selected color samples to form a compressed color image.

2. The method of claim 1, wherein compressing the color image using the grayscale image and the selected color samples comprises:
   reconstructing the color image using the grayscale image and the selected color samples;
   generating a residual image using the color image and reconstructed color image, the residual image representing a difference between the color image and the reconstructed color image; and
   compressing the residual image using the grayscale image and the selected color samples.

3. The method of claim 1, wherein separating the color image into a grayscale image and a plurality of color channel images comprises:
   converting the color image in a first color space into an image in a second color space, wherein pixels representing intensity information of the color image in the second color space form the grayscale image.

4. The method of claim 3, wherein the first color space is a red-green-blue (RGB) color space and the second color space is a YUV color space, wherein pixels containing color information in the YUV color space form the plurality of color channel images.

5. The method of claim 1, wherein selecting color samples for each image segment comprises:
   using one of a plurality of color sample selection methods to select the color samples; and
   storing information indicating which of the plurality of color sample selection methods was used to select the color samples with the compressed color image.

6. The method of claim 5, wherein one of the plurality of color sample selection methods is to select a color sample for an image segment at a fixed location of the segment.

7. The method of claim 5, wherein one of the plurality of color sample selection methods is to select a color sample for an image segment, a grayscale value of the selected color sample having maximum grayscale value among the pixels of the same segment.

8. The method of claim 5, wherein one of the plurality of color sample selection methods is to select a color sample for an image segment, a grayscale value of the selected color sample having minimum grayscale value among the pixels of the same segment.

9. The method of claim 5, wherein one of the plurality of color sample selection methods is to select two color samples for an image segment, a grayscale value of one of the selected color samples having maximum grayscale value among the pixels of the same segment and a grayscale value of the other selected color sample having minimum grayscale value among the pixels of the same segment.

10. The method of claim 5, wherein one of the plurality of color sample selection methods is to select a color sample for an image segment, a grayscale value of the selected color sample having a minimum grayscale value among the pixels of the same segment, and a grayscale value of the selected color sample of neighboring image segment having a maximum grayscale value among the pixels of the same segment.

11. The method of claim 5, wherein one of the plurality of color sample selection methods is to randomly select a color sample for each image segment.

12. A non-transitory computer-readable storage medium storing executable computer program instructions for compressing a color image using selected color samples of the color image, the computer program instructions comprising instructions for:

accessing a color image having a plurality of pixels, each pixel containing intensity and color information of the image;
  separating the color image into a grayscale image and a plurality of color channel images using the intensity and color information;
  dividing the color channel images into a plurality of image segments;
  selecting color samples from the plurality of image segments; and
  compressing the color image using the grayscale image and the selected color samples to form a compressed color image.

13. The computer-readable storage medium of claim 12, wherein the computer program instructions for compressing the color image using the grayscale image and the selected color samples comprise instructions for:

reconstructing the color image using the grayscale image and the selected color samples;
  generating a residual image using the color image and reconstructed color image, the residual image representing a difference between the color image and the reconstructed color image; and
  compressing the residual image using the grayscale image and the selected color samples.

14. The computer-readable storage medium of claim 12, wherein the computer program instructions for separating the color image into a grayscale image and a plurality of color channel images further comprise instructions for:

converting the color image in a first color space into an image in a second color space, wherein pixels representing intensity information of the color image in the second color space form the grayscale image.

15. The computer-readable storage medium of claim 14, wherein the first color space is a red-green-blue (RGB) color space and the second color space is a YUV color space, wherein pixels containing color information in the YUV color space form the plurality of color channel images.

16. The computer-readable storage medium of claim 12, wherein the computer program instructions for selecting color samples for each image segment comprise instructions for:

using one of a plurality of color sample selection methods to select the color samples; and
  storing information indicating which of the plurality of color sample selection methods was used to select the color samples with the compressed color image.

17. The computer-readable storage medium of claim 16, wherein one of the plurality of color sample selection methods is to select a color sample for an image segment at a fixed location of the segment.

18. The computer-readable storage medium of claim 16, wherein one of the plurality of color sample selection methods is to select a color sample for an image segment, a grayscale value of the selected color sample having maximum grayscale value among the pixels of the same segment.

19. The computer-readable storage medium of claim 16, wherein one of the plurality of color sample selection methods is to select a color sample for an image segment, a grayscale value of the selected color sample having minimum grayscale value among the pixels of the same segment.

20. The computer-readable storage medium of claim 16, wherein one of the plurality of color sample selection methods is to select two color samples for an image segment, a grayscale value of one of the selected color samples having maximum grayscale value among the pixels of the same segment and a grayscale value of the other selected color sample having minimum grayscale value among the pixels of the same segment.

21. The computer-readable storage medium of claim 16, wherein one of the plurality of color sample selection methods is to select a color sample for an image segment, a grayscale value of the selected color sample having a minimum grayscale value among the pixels of the same segment, and a grayscale value of the selected color sample of neighboring image segment having a maximum grayscale value among the pixels of the same segment.

22. The computer-readable storage medium of claim 16, wherein one of the plurality of color sample selection methods is to randomly select a color sample for each image segment.

23. A computer system for compressing a color image using selected color samples of the color image, the system comprising:

a module for:
    accessing a color image having a plurality of pixels, each pixel containing intensity and color information of the image; and
    separating the color image into a grayscale image and a plurality of color channel images using the intensity and color information;
  a module for dividing the color channel images into a plurality of image segments;
  a module for:
    selecting color samples from the plurality of image segments; and
    compressing the color image using the grayscale image and the selected color samples to form a compressed color image; and
  a computer processor configured to execute the modules.

24. The system of claim 23, wherein compressing the color image using the grayscale image and the selected color samples comprises:

reconstructing the color image using the grayscale image and the selected color samples;
  generating a residual image using the color image and reconstructed color image, the residual image representing a difference between the color image and the reconstructed color image; and
  compressing the residual image using the grayscale image and the selected color samples.

25. The system of claim 23, wherein separating the color image into a grayscale image and a plurality of color channel images comprises:

converting the color image in a first color space into an image in a second color space, wherein pixels representing intensity information of the color image in the second color space form the grayscale image.

26. The system of claim 25, wherein the first color space is a red-green-blue (RGB) color space and the second color space is a YUV color space, wherein pixels containing color information in the YUV color space form the plurality of color channel images.

27. The system of claim 23, wherein selecting color samples comprises:
using one of a plurality of color sample selection methods to select the color samples; and
storing information indicating which of the plurality of color sample selection methods was used to select the color samples with the compressed color image.

28. The system of claim 27, wherein one of the plurality of color sample selection methods is to select a color sample for an image segment at a fixed location of the segment.

29. The system of claim 27, wherein one of the plurality of color sample selection methods is to select a color sample for an image segment, a grayscale value of the selected color sample having maximum grayscale value among the pixels of the same segment.

30. The system of claim 27, wherein one of the plurality of color sample selection methods is to select a color sample for an image segment, a grayscale value of the selected color sample having minimum grayscale value among the pixels of the same segment.

31. The system of claim 27, wherein one of the plurality of color sample selection methods is to select two color samples for an image segment, a grayscale value of one of the selected color samples having maximum grayscale value among the pixels of the same segment and a grayscale value of the other selected color sample having minimum grayscale value among the pixels of the same segment.

32. The system of claim 27, wherein one of the plurality of color sample selection methods is to select a color sample for an image segment, a grayscale value of the selected color sample having a minimum grayscale value among the pixels of the same segment, and a grayscale value of the selected color sample of neighboring image segment having a maximum grayscale value among the pixels of the same segment.

33. The system of claim 27, wherein one of the plurality of color sample selection methods is to randomly select a color sample for each image segment.

* * * * *